J. F. HENDERSON.
Coffee-Pot.
No. 227,251.                     Patented May 4, 1880.
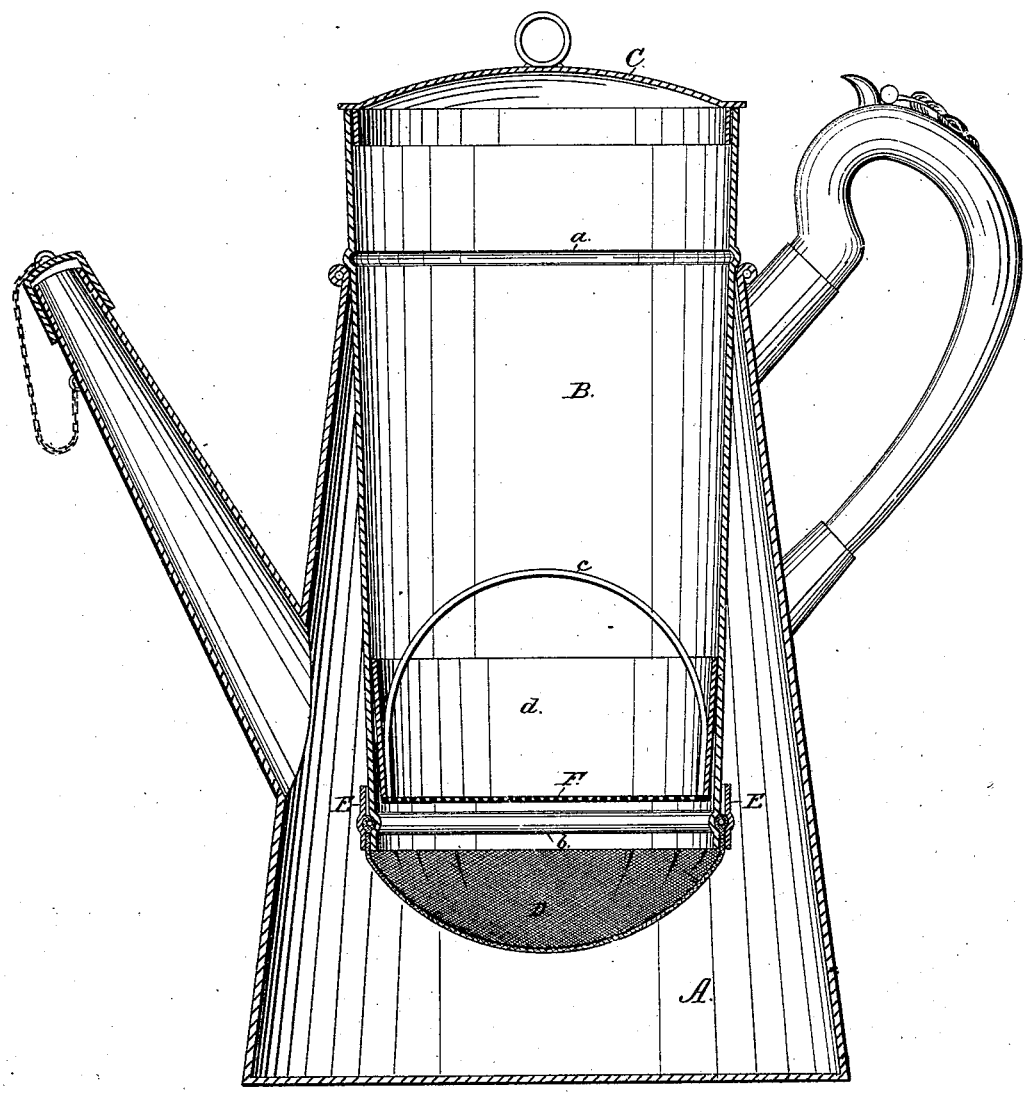
WITNESSES:
W. W. Hollingsworth
John C. Kenon
INVENTOR:
John F. Henderson
BY
ATTORNEYS.

UNITED STATES PATENT OFFICE.

JOHN F. HENDERSON, OF FRANKLIN, KENTUCKY.

COFFEE-POT.

SPECIFICATION forming part of Letters Patent No. 227,251, dated May 4, 1880.

Application filed January 27, 1880.

*To all whom it may concern:*

Be it known that I, JOHN F. HENDERSON, of Franklin, in the county of Simpson and State of Kentucky, have invented a new and Improved Coffee-Pot; and I do hereby declare that the following is a full, clear, and exact description of the same, reference being had to the accompanying drawing, forming part of this specification, in which the figure is a vertical central section.

My invention relates to certain improvements in coffee-pots designed to more thoroughly extract the strength of the coffee and without boiling. It is an improvement upon that general form of coffee-pot in which a pendent cylindrical water-receptacle is placed in the top of the pot, and is provided with a straining-sack below, in which is contained the ground coffee.

The invention consists in arranging the edge of a seamless sack on the exterior lower edge of said cylinder and clamping it there by means of a ring which fits over the said edge of the sack, and combining with the said cylinder and sack a perforated cover having a handle and an upwardly-enlarging ring, which fits closely in the cylinder and forms a cover to the coffee in the sack to keep it from rising, while the space above the cover in the elongated cylinder forms a receptacle to contain hot water, which is allowed to slowly filter through the coffee in the sack.

In the drawing, A represents the external case of the coffee-pot, which is of the usual form. B is the elongated cylinder, which, near its top, is formed with a swell or bead, *a*, by which it is suspended from the rim of the coffee-pot. This cylinder is provided with a cover, C, which forms the top of the coffee-pot, and is made long enough to extend well down into the coffee-pot. At the bottom edge of the cylinder is formed an inwardly-projecting groove or bead, *b*, around and upon the outside of which is fastened, by a string or otherwise, the hem of the seamless sack D. To hold this bag securely upon the lower edge of the cylinder a sheet-metal ring, E, is forced over the edge of the sack and allowed to remain there, as shown.

Inside the cylinder, and forming a top to the sack, is a perforated sheet-metal cover, F, having a handle, *c*. Rising from the edge of this cover F is an upwardly-enlarging ring, *d*, which flares outwardly as it rises, and serves, when the cover F is fitted over the bag, to close tightly against the walls of the cylinder and prevent the passage of water down at any other place except through the perforations in the cover.

In making use of my improvement as thus described a given amount of ground coffee is first placed in the sack, the cover F adjusted thereon, the cylinder placed in the coffee-pot, and the proper amount of hot water then poured in the cylinder, and the cover C of the cylinder then adjusted to its place. As the water in the cylinder passes down through the coffee from hydrostatic pressure it passes through the coffee in the sack, thoroughly extracting its principles and preserving its aroma, while the sack allows the liquid coffee to be strained into the pot of a rich wine color, free from any sediment or dregs.

When the parts are to be cleaned the ring E is easily slipped off, and the sack may then be discharged of the coffee-grounds and washed.

Having thus described my invention, what I claim as new is—

The cylinder B, having at its lower edge an inwardly-projecting bead or groove, *b*, in combination with the sack D, adapted to fit over the outside surface of said cylinder, the clamping-ring E, and the perforated cover F, having a handle and an upwardly-enlarging ring, *d*, as and for the purpose described.

JOHN F. HENDERSON.

Witnesses:
T. J. PRICE,
W. T. SANDERS.